(12) United States Patent
Walter

(10) Patent No.: US 9,248,735 B2
(45) Date of Patent: Feb. 2, 2016

(54) LIQUID FUEL TRAP DEVICE

(75) Inventor: Stefan Walter, Stutensee (DE)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/240,749

(22) PCT Filed: Aug. 27, 2012

(86) PCT No.: PCT/EP2012/066570
§ 371 (c)(1),
(2), (4) Date: Jun. 13, 2014

(87) PCT Pub. No.: WO2013/026938
PCT Pub. Date: Feb. 28, 2013

(65) Prior Publication Data
US 2014/0318505 A1     Oct. 30, 2014

(30) Foreign Application Priority Data

Aug. 25, 2011 (GB) .................................. 1114705.5

(51) Int. Cl.
*F02M 33/02* (2006.01)
*B60K 15/035* (2006.01)
*F02M 25/08* (2006.01)

(52) U.S. Cl.
CPC ...... *B60K 15/03504* (2013.01); *F02M 25/0872* (2013.01); *B60K 2015/03514* (2013.01); *F02M 2025/0863* (2013.01); *Y10T 137/86324* (2015.04)

(58) Field of Classification Search
CPC .......... B60K 15/077; B60K 15/03504; B60K 2015/03171; B60K 2015/03514; F02M 25/0872; F02M 25/0863

USPC .......... 123/514, 519–520; 137/262, 573–574, 137/576, 587
See application file for complete search history.

(56) References Cited

U.S. PATENT DOCUMENTS

| | | | | |
|---|---|---|---|---|
| 3,614,960 A | * | 10/1971 | Pfrengle | 137/43 |
| 5,927,315 A | * | 7/1999 | Kim | 137/43 |
| 6,405,747 B1 | * | 6/2002 | King et al. | 137/202 |
| 6,450,192 B1 | * | 9/2002 | Romanek | 137/202 |
| 6,557,581 B2 | * | 5/2003 | Ehrman et al. | 137/587 |
| 6,779,544 B2 | * | 8/2004 | Devall | 137/202 |
| 6,860,286 B2 | | 3/2005 | Doan | |
| 6,889,669 B1 | * | 5/2005 | Perry et al. | 123/520 |
| 2002/0157715 A1 | | 10/2002 | Viebahn | |
| 2011/0272412 A1 | | 11/2011 | Pozgainer et al. | |

FOREIGN PATENT DOCUMENTS

| | | |
|---|---|---|
| DE | 20019968 U1 | 2/2001 |
| DE | 10052399 A1 | 5/2002 |
| DE | 102009005826 A1 | 7/2010 |
| EP | 1967404 A1 | 9/2008 |
| GB | 2238041 A | 5/1991 |
| JP | 2006336495 A | 12/2006 |

* cited by examiner

*Primary Examiner* — Hung Q Nguyen
(74) *Attorney, Agent, or Firm* — Leydig, Voit & Mayer, Ltd.

(57) ABSTRACT

A liquid fuel trap device for a vehicle fuel system includes a housing forming a confined space and including an outlet port connectable to a fuel vapor recovery system via a fuel vapor passage; and a valve capable of discharging liquid fuel from the confined space into a fuel tank. The housing includes at least two retention devices adapted to impede fuel in the housing from reaching the outlet port in angled positions of the housing.

9 Claims, 4 Drawing Sheets

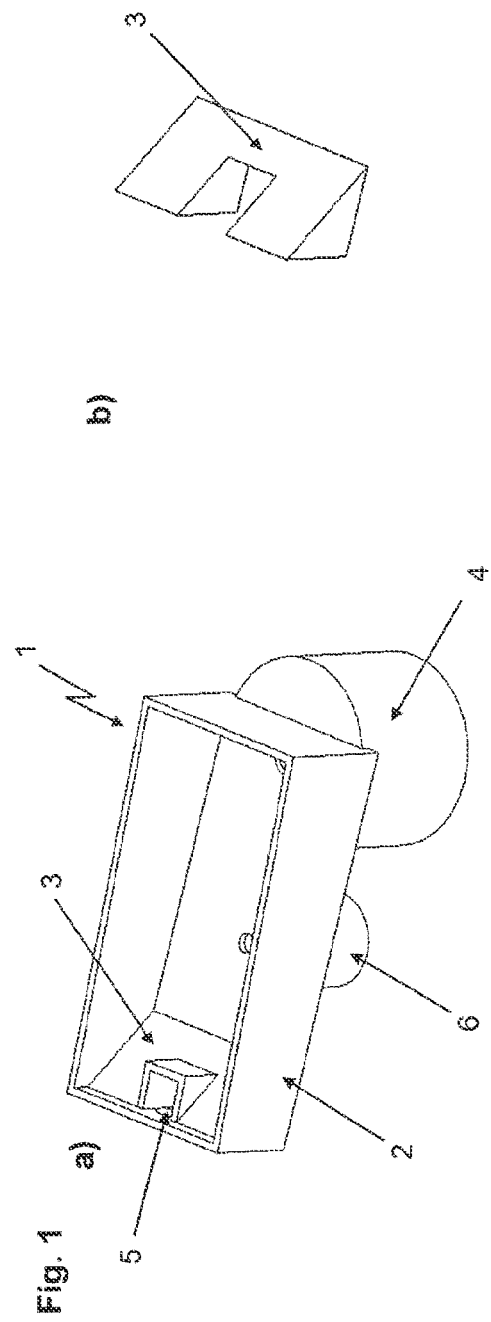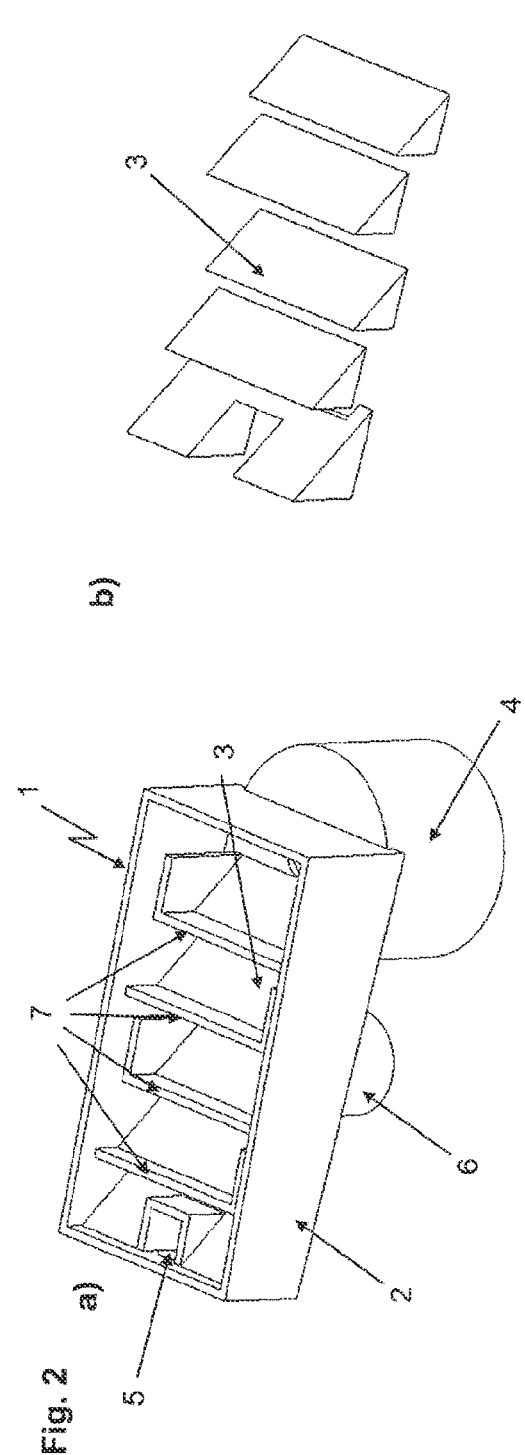

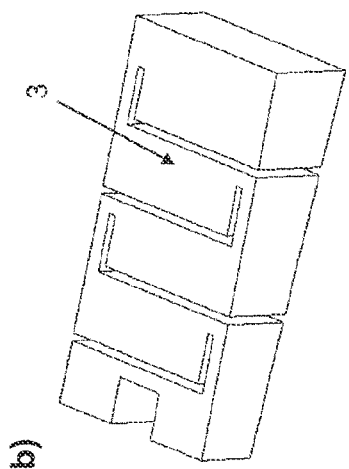
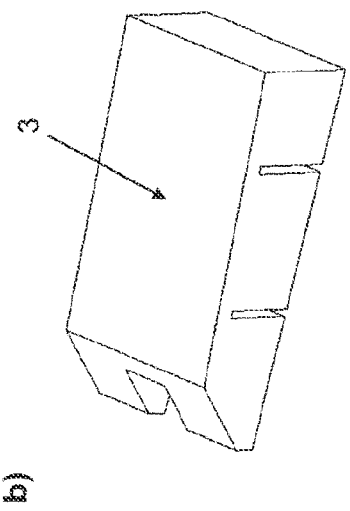
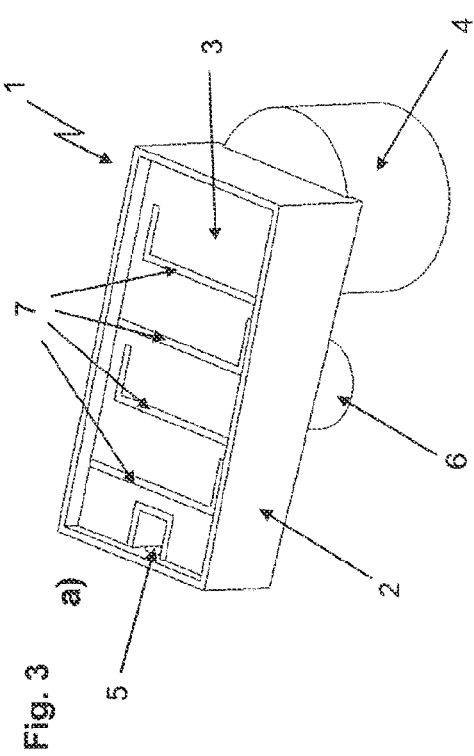
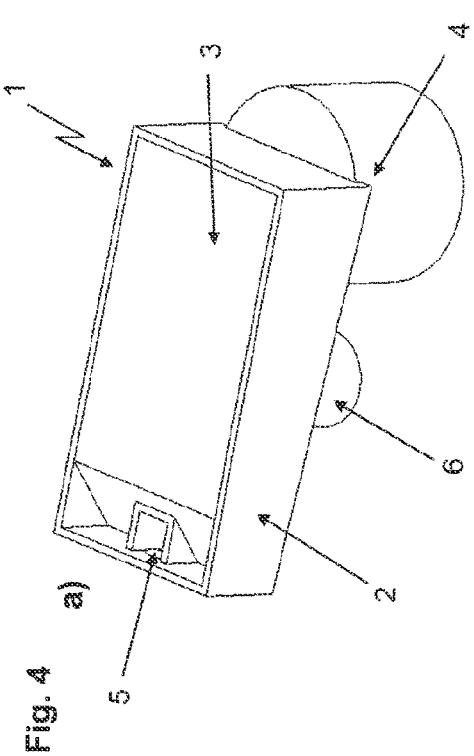

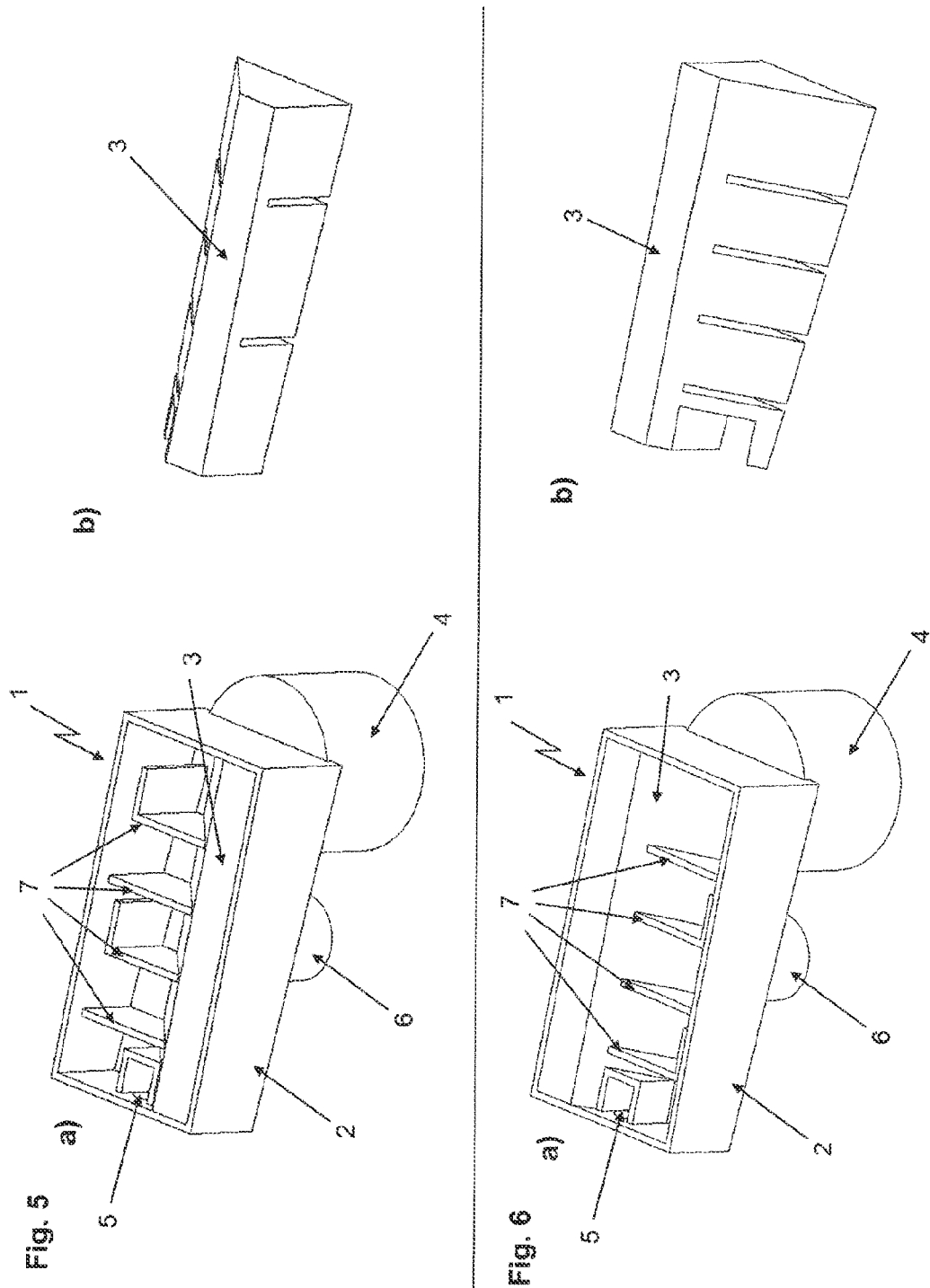

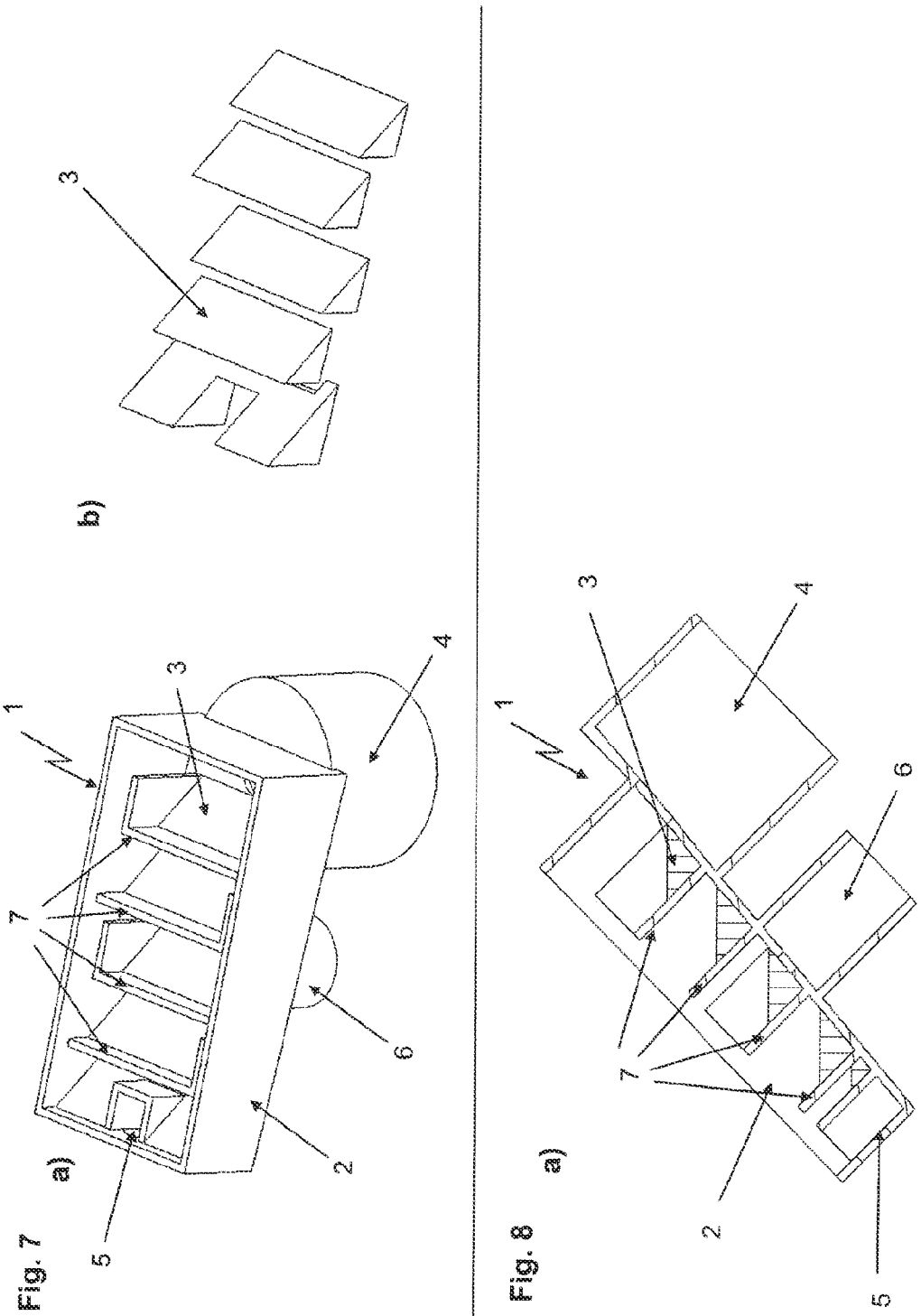

LIQUID FUEL TRAP DEVICE

CROSS-REFERENCE TO RELATED APPLICATIONS

This application is a U.S. National Phase Application under 35 U.S.C. §371 of International Application No. PCT/EP2012/066570, filed on Aug. 27, 2012, and claims benefit to Great Britain Patent Application No. GB 1114705.5, filed on Aug. 25, 2011. The International Application was published in English on Feb. 28, 2013 as WO 2013/026938 A1 under PCT Article 21(2).

FIELD

The present invention relates to vehicle fuel systems and more specifically it is concerned with a Liquid Fuel Trap (LFT), at times also referred to also as an expansion tank or expansion canister.

BACKGROUND

In general, vehicle systems comprise, among other items, a fuel tank fitted with a filler neck, a variety of fuel valves, a tubing for supplying fuel to the ignition system and a fuel vapor treating system (typically a carbon filter recovery system canister) to which fuel vapor from the fuel tank flows and is then used for enriching the fuel mixture fed to the ignition system.

Fuel fluid (in form of liquid, droplets, spray and vapor) from the fuel tank flows via the one or more valves, which are connected via suitable tubing, to a liquid trap intermediate the fuel vapor recovery and the tank.

The liquid trap receives fuel fluid flowing from the fuel tank which flows via the one or more valves, which flows at a relatively high velocity owing to pressure and temperature changes, and thus vapor flowing from the fuel tank carries along with it also a considerable amount of liquid fuel in the form of droplets (as a result of venturi effect). The liquid trap entraps the liquid fuel and allows fuel vapor flow towards the vapor recovery system. The liquid fuel then returns back to the fuel tank, upon pressure decrease within the fuel tank.

The document DE 100 52 399 A1 discloses a vehicle's fuel system comprising a fuel tank, at least one fuel venting valve, a fuel recovery system and a liquid fuel trap extending between the at least one fuel valve fuel valve and the liquid fuel trap, said liquid fuel trap comprising a housing formed with a confined space with at least one inlet port connectable to the corresponding at least one fuel venting valve, an outlet port connectable to the fuel vapor recovery system, and a liquid fuel discharge assembly for discharging liquid fuel into the fuel tank, said liquid fuel discharge assembly fitted with a fuel propelling mechanism.

A liquid fuel trap is important in those cases where the various valves fitted within the tank are internally installed, i.e. do not project from an upper wall of the tank, where siphons may be generated at tubes connecting to the valves to the liquid trap. Such siphons interfere with venting the tank on the one hand and, on the other hand, interfere with draining of the devices.

From U.S. Pat. No. 6,860,286 B2 a liquid fuel trap is known, comprising a housing formed with a confined space with at least one inlet port connectable to a corresponding fuel valve, an outlet port connectable to a fuel vapor recovery system, and a liquid fuel discharge valve adapted for discharging liquid fuel from the confined space into the tank. The housing further comprises a connecting arrangement for attaching the device on an inner surface of an upper wall of the fuel tank. Liquid flow from at least one inlet port is prevented from direct flowing or splashing to the outlet port. This effect may also be achieved by designing the at least one inlet port and the outlet port at different levels and axially diverted, i.e. not axially extending. Thus, the confined space may be formed with several unleveled chambers, where the inlet and outlet ports are fitted at different levels.

Such an arrangement could be used to prevent liquid fuel from getting out of the tanks venting system into the carbon canister in angle scenarios, this means situations like acceleration/deceleration of the vehicle and situations resulting in lateral and elevational liquid fuel displacement within the fuel tank (e.g. also by tilt of the vehicle).

The disadvantage is, that such an arrangement is quite complex and therefore cost-intensive.

SUMMARY

In an embodiment, the present invention provides a liquid fuel trap device for a vehicle fuel system. The liquid fuel trap device includes: a housing forming a confined space and including an outlet port connectable to a fuel vapor recovery system via a fuel vapor passage; and a valve capable of discharging liquid fuel from the confined space into a fuel tank. The housing includes at least two retention devices adapted to impede fuel in the housing from reaching the outlet port in angled positions of the housing.

BRIEF DESCRIPTION OF THE DRAWINGS

The above and other aspects, features and advantages of the invention will be apparent from the following detailed description of illustrative embodiments which is to be read in connection with the accompanying drawings, in which:

FIG. 1 is a schematic view of a liquid trap without retention means in an angle scenario;

FIG. 2 is a schematic view of a liquid trap with retention means according to a preferred embodiment of the invention in a similar angle scenario as the liquid trap of FIG. 1;

FIG. 3 is a schematic view of a liquid trap according to a preferred embodiment of the invention in a horizontal position;

FIGS. 4 to 7 show the liquid trap of FIG. 2 in different angle scenarios; and FIG. 8a) is a cross section through a liquid trap as shown and in the same angle scenario as in FIG. 7 with fuel.

DETAILED DESCRIPTION

In an embodiment, the present invention provides a liquid fuel trap for a vehicle's fuel system, in which the liquid fuel can be prevented in a simple way in getting into the carbon canister in angle scenarios.

According to the invention a liquid fuel trap device for a vehicle fuel system is provided. The device according to the invention comprises a housing forming a confined space with at least one port connectable to a fuel vapor passage and a valve capable of discharging liquid fluid from said space into the tank. Further to that the housing comprises at least two retention means to refrain the fuel in the housing from reaching the outlet port connectable to the fuel vapor recovery system in angle scenarios. So the at least one inlet port is connectable to at least one corresponding fuel valve. The outlet port is connectable to a fuel vapor passage capable of communicating with the environment, possibly through a fuel vapor recovery system depending on whether integrated parts or diesel parts are used. Further the liquid fuel discharge valve is adapted for discharging liquid fuel from said space into the tank.

A liquid trap is a feature in vehicle motors to retain liquid fuel from getting out of the tanks venting system into a fuel vapor passage capable of communicating with the environment, possibly through the fuel vapor recovery system, usually a carbon canister. It is usually mounted between fuel vapor valves and the fuel vapor recovery system to trap liquid fuel that passes the valves. Depending on the driving condition shows the liquid trap different useable capacities.

According to the invention and due to the retention means the fuel in the liquid fuel trap device is hindered to reach the outlet port connectable to the fuel vapor system. In this manner fuel is prevented from entering the carbon canister, which would lead to a major defect of the carbon canister.

In a preferred embodiment of the invention, the retention means comprise at least one barrier.

Hereby it might be advantageous if the at least one barrier is arranged in the housing between a portion of the liquid trap and the at least one port connectable to a fuel vapor line.

Further to that preferably the at least one barrier is a surface extending substantially but not completely across the entire width of the housing.

In another preferred embodiment of the invention the panels extent from the bottom of the housing upwards with an angle of about 90° or less in direction to the port connectable to a fuel vapor passage.

In another preferred embodiment of the invention the retention means comprise several panels.

Further it might be advantageous if the bottom of the liquid trap is angled downwards with the fuel vapor passage from the tank being the lowest point. That way all liquid fuel within the liquid trap will automatically drain back into the fuel vapor passage to the tank when the liquid trap is inclined (towards the liquid trap outlet) at an angle less than the angle of the liquid trap bottom surface.

With reference to FIG. 1a) it is shown a schematic view of a liquid trap device 1 without any retention means according to an embodiment known from the state of the art. FIG. 1a) shows the liquid trap device 1 in an angle scenario. Depending on the arrangement of the liquid trap in the vehicle the shown angle scenario might be either a right turn, a left turn or an acceleration situation, whereby acceleration might be positive or negative, which is a breaking situation.

In this shown embodiment fuel fluid (in form of liquid, droplets, spray and/or vapor) from the fuel tank flows via the valve 4 and 6 into the liquid trap 2 which might be positioned intermediate the fuel vapor recovery and the tank of a vehicle.

The liquid trap 2 receives fuel fluid 3 from the fuel tank via the valve 4 and 6, which flows at a relatively high velocity owing to vehicle dynamics, pressure and temperature changes, and thus vapor coming from the fuel tank carries along also a considerable amount of liquid fuel 3 in the form of droplets. The liquid trap 2 traps the liquid fuel 3 and allows fuel vapor flow via the outlet port 5 towards a vapor recovery system. The liquid fuel 4 then returns via vent valve or fill limit valve 4 back to the fuel tank, upon pressure decrease within the fuel tank, vapor flow decrease through valve 4 or simple gravity.

In FIG. 1b) it is shown the maximum of liquid which could be prevented from reaching the outlet port 5 in the angle scenario of FIG. 1a). In this manner fuel 3 is prevented from entering the carbon canister, which would lead to a major defect of the carbon canister.

As can be taken from FIG. 1b) in a liquid fuel trap device 1 for a vehicle fuel system according to the invention, the device comprises a housing forming a confined space, the fuel trap area 2 with at least one port connectable to a fuel vapor system and a vapor vent valve or fill limit valve 6 adapted for discharging liquid fuel from said space into the tank. The housing or fuel trap area 2 comprises several retention means 7 which are arranged between the valve device 4 and 6 and the outlet port 5 to refrain the fuel in the housing 2 from reaching the outlet port 5 in angle scenarios. The retention means 7 are a kind of barriers. It is provided in the embodiment shown in FIG. 1b) a kind of retention ribbing in the housing 2. The barriers in a form of a panel or a rib extend substantially but not completely over the entire width of the housing 2 and show an angle at the end according to the shown preferred embodiment. With an arrangement like this the retention is only "active" in angle scenarios but does not negatively influence the performance of the fuel vapor valve 4 and 6 in the other dynamic situations.

The panels or ribs 7 in the housing 2 extend preferably from the bottom of the housing 2 upwards with an angle.

In an embodiment shown in FIG. 1b) the capacity of the liquid trap 2 in angle scenarios can be easily increased. When for example full breaking has to be conducted about 1 G negative acceleration or more can appear. With an arrangement according to the invention the capacity of the liquid trap 2 can be significantly increased compared to an arrangement shown in FIG. 1a).

In FIG. 2 it is shown a schematic view of a liquid trap device 1 with retention means 7 according to a preferred embodiment of the invention in a same angle scenario as the liquid trap device of FIG. 1.

In the embodiment shown in FIG. 2 the retention means 7 are L-shaped angle brackets extending substantially perpendicular from the baseplate of the liquid trap 2. The L-shaped angle brackets 7 are alternating arranged in the liquid trap 2.

FIG. 2b) shows the maximum of liquid which could be prevented from reaching the outlet port 5 in the angle scenario of FIG. 2a). When comparing FIG. 1b) and FIG. 2b) it is obvious, that the amount of liquid 3 which could be retained in the liquid trap 2 without reaching the outlet port 5 is much higher in FIG. 2b) then in FIG. 1b). This means that in a liquid trap device 1 according to the invention, which comprises inter alia retention means 7 the amount of liquid being prevented from reaching the outlet port 5 is much higher then in an embodiment according an embodiment known from the art.

In FIG. 3a) it is shown a schematic view of a liquid trap device 1 according to a preferred embodiment of the invention in a horizontal position. The liquid trap is filled with fuel 3. FIG. 3b) shows again schematically the amount of fuel 3 which could be hold in the liquid trap 2 without reaching the outlet port 5.

The device of FIG. 3a) is also shown in FIG. 4a) but in a different angle scenario. FIG. 4b) is the schematic illustration of the amount of fuel 3 which could be hold in the liquid trap 2.

The situation is shown could be for example considered as the vehicle is turning left. In this situation it can be seen that the fuel 3 in the liquid trap 2 moves to the other, in this case this means the right side.

FIG. 5 shows a view of the fuel trap device 1 in an acceleration situation and FIG. 6 in a braking situation of the vehicle. Further to that in FIG. 7 a situation, when the vehicle is turning right, is shown. It is obvious that the situation named here is just for the sake of example and depend on the orientation of the liquid trap device mounted in the vehicle.

FIG. 6 is a schematic view of the liquid trap device 1 in an accelerating situation which is in this shown and described embodiment negative and therefore a braking situation. Here it is shown that in a braking situation not too much fuel 3 might be in the fuel trap 2.

FIG. 8 is a cross section through a liquid trap as shown and in the same angle scenario as in FIG. 7 with fuel.

A 45° forward inclination of the liquid trap is shown in FIG. 8a). This could be the situation created by accelerating.

In the shown embodiment of the liquid trap device 1 receives fuel fluid 3 from the fuel tank via the valve 4 or 6. The liquid trap 2 traps the liquid fuel 3 and allows fuel vapor flow via the outlet port 5 towards a vapor recovery system. The liquid fuel 3 then returns via a vent valve or fill limit valve 6 back to the fuel tank, upon pressure decrease within the fuel tank, decrease of vapor flow through valve 6 or gravity.

The angle scenarios of a liquid trap device shown in the drawings visualize, that these situations result in lateral and elevational liquid fuel 3 displacement within the liquid trap 2 (e.g. also by tilt of the vehicle) which means liquid fuel 3 from the liquid trap 2 can in these situation get out of the tanks venting system and for example through the outlet port 5 into the carbon canister. This depends on the amount of liquid fuel 3 in the fuel trap and also from the magnitude of the angle scenario.

To improve the liquid trap capacity in the above further described "worst-case" dynamic situations, according to the invention simple retention features are introduced to create more useable liquid trap capacity in only these driving conditions where needed. In all other dynamic situations the retention features show no negative effects or do negative influence the performance of the fuel vapor valve in any way.

It is obvious for a person skilled in the art that the described embodiments are only for the sake of explanation and not limiting the invention which is defined by the invention.

In contrast to the embodiments shown the panels or ribs 7 may be also arranged in a manner that they extend with an angle of 45° from the base of the housing 2. Yet this angle can vary depending on specific customer requirements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A liquid fuel trap device for a vehicle fuel system, the liquid fuel trap device comprising:
   a housing forming a confined space and including an outlet port connectable to a fuel vapor recovery system via a fuel vapor passage; and
   a valve disposed between the confined space formed by the housing and a fuel tank, the valve being capable of discharging liquid fuel from the confined space into the fuel tank,
   wherein the housing includes at least two retention devices adapted to impede fuel in the housing from reaching the outlet port in angled positions of the housing.

2. The liquid fuel trap device according to claim 1, wherein each of the retention devices includes at least one barrier.

3. The liquid fuel trap device according to claim 2, wherein the at least one barrier is disposed in the housing between a portion of the liquid trap and the outlet port.

4. The liquid fuel trap device according to claim 2, wherein the at least one barrier includes a surface extending substantially across an entire width of the housing.

5. The liquid fuel trap device according to claim 4, wherein the surface extends from a bottom of the housing upwards with an angle of about 90° or less in direction toward the outlet port.

6. The liquid fuel trap device according to claim 2, wherein the at least two retention devices are L-shaped angle brackets extending substantially perpendicular from a baseplate of the liquid trap.

7. The liquid fuel trap device according to claim 6, wherein each of the at least two L-shaped angle brackets includes a long piece extending substantially perpendicular from the baseplate and a short piece extending substantially perpendicular from the baseplate,
   wherein the liquid trap includes at least two side plates,
   wherein the short piece of each L-shaped angle bracket extends substantially parallel to at least one of the at least two side plates,
   wherein the long piece of each L-shaped angle bracket extends substantially perpendicular from a single one of the at least two side plates, and
   wherein the long pieces of adjacent L-shaped angle brackets extend substantially perpendicular from different side plates.

8. The liquid fuel trap device according to claim 6, wherein a fuel hold volume is formed by each L-shaped angle bracket and the baseplate, each fuel hold volume being adapted to retain fuel when the fuel trap device is angled.

9. The liquid fuel trap device according to claim 1, wherein each of the retention devices includes a plurality of surfaces.

* * * * *